J. S. & R. T. HIGGINS.
Water-Aerator.
No. 210,034. Patented Nov. 19, 1878.
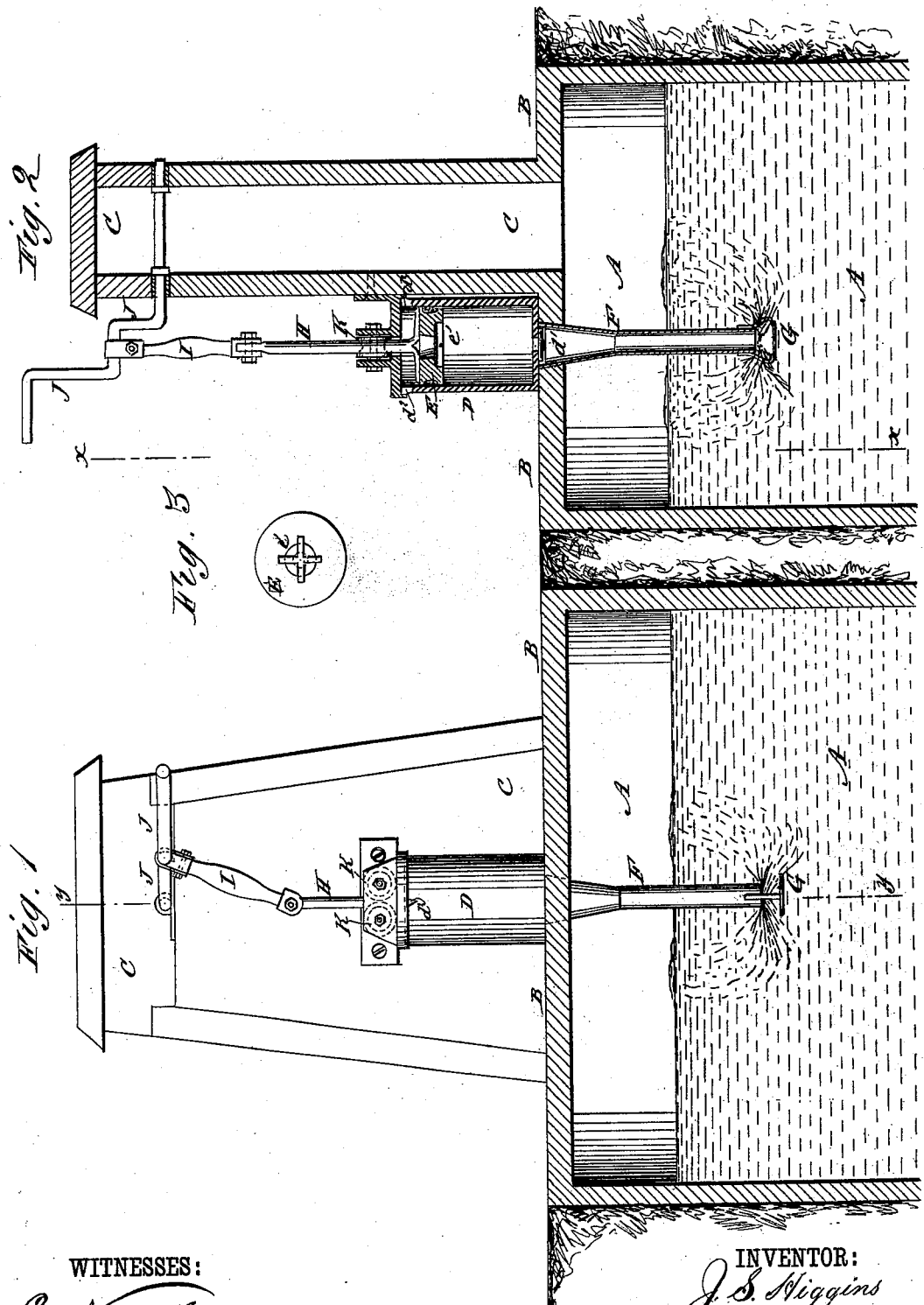
WITNESSES:
C. Nvrux
C. Sedgwick
INVENTOR:
J. S. Higgins
R. T. Higgins
BY Munn & Co
ATTORNEYS.

UNITED STATES PATENT OFFICE.

JEROME S. HIGGINS AND RIVERIOUS T. HIGGINS, OF CALIFORNIA, MO.

IMPROVEMENT IN WATER-AERATORS.

Specification forming part of Letters Patent No. 210,034, dated November 19, 1878; application filed October 11, 1878.

*To all whom it may concern:*

Be it known that we, JEROME SILLIMAN HIGGINS and RIVERIOUS THORNTON HIGGINS, of California, in the county of Moniteau, and State of Missouri, have invented a new and useful Improvement in Water-Aerators, of which the following is a specification:

Figure 1 is a side view of my improved device, the cistern being shown in section through the line $x\,x$, Fig. 2. Fig. 2 is a vertical section of the same, taken through the line $y\,y$, Fig. 1. Fig. 3 is a detail bottom view of the piston.

Similar letters of reference indicate corresponding parts.

The object of this invention is to furnish an improved device for forcing air into and through the water contained in wells, cisterns, tanks, and other vessels to purify it, and which shall be simple in construction and convenient in use.

The invention consists in the combination of the cylinder provided with the valve and the air-holes, the piston provided with the valve, the tube, the piston-rod, and the pivoted connecting-rod with a well, cistern, tank, or other water-reservoir, and with a crank or other operating mechanism; in the combination of the distributer with the discharge-tube of the cylinder; and in the combination of the two grooved wheels with the cover of the cylinder and with the rod of its piston, as hereinafter fully described.

A represents a well, cistern, tank, or vessel, in which water stands. B represents the cover of the well, cistern, or tank. C represents the curb, in which the elevator is secured.

To the cover B is attached a hollow cylinder, D, within which works a piston, E, which is provided with a valve, $e'$, opening downward.

In the bottom of the cylinder D is formed an opening, which is provided with a valve, $d'$, opening downward.

To the bottom of the cylinder D, around the valve $d^1$, is secured the upper end of a tube, F, which extends down deep into the water, and has a cone or plate, G, suspended a little below its open lower end, to divide the blast of air and cause it to pass into the water in different directions.

To the piston E is attached the piston-rod H, which passes up through a hole in the cover of the cylinder D, and to its upper end is pivoted the lower end of the connecting-rod I.

The upper end of the connecting-rod I is pivoted to the crank, lever, or other mechanism, J, that operates the water-elevator, or to a crank or other mechanism designed especially to operate the said piston.

To the cover of the cylinder D, or to supports attached to the said cover, upon the opposite sides of the piston-rod H, are pivoted two grooved wheels, K, to support the said piston-rod H against side pressure from the operating mechanism.

In the upper part of the cylinder D are formed a number of openings, $d^2$, to admit air.

With this construction, as the piston E is raised the air passes in through the openings $d^2$, opens the valve $e'$, and passes down into the lower part of the cylinder D. As the piston E is lowered the pressure of the air closes the valve $e'$ and opens the valve $d^1$, and the air is forced down into and through the tube F, into the water, agitating and purifying it.

Having thus described our invention, we claim as new and desire to secure by Letters Patent—

The combination of the cylinder D, provided with the valve $d^1$ at its bottom and the air-holes $d^2$ at its top, directly under the cover, the piston E, provided with the valve $e'$, the tube F, provided with the distributer G, the piston-rod H, and the pivoted connecting-rod I, with a well, cistern, tank, or other water-reservoir, and with a crank, J, or other operating mechanism, substantially as and for the purpose described.

JEROME SILLIMAN HIGGINS.
RIVERIOUS THORNTON HIGGINS.

Witnesses:
MATT. BOLAND,
C. G. HICKCOX.